United States Patent [19]
Vystrcil et al.

[11] Patent Number: 5,797,162
[45] Date of Patent: Aug. 25, 1998

[54] EXTENDABLE HOSE FOR A VACUUM CLEANER

[75] Inventors: Robert A. Vystrcil, West Farmington; Mark E. Cipolla, Chardon; Charles J. Thur, Broadview Heights; Jeffrey M. Kalman, Cleveland Heights; Michael F. Wright, Cuyahoga Falls, all of Ohio

[73] Assignee: Royal Appliance Mfg. Co., Cleveland, Ohio

[21] Appl. No.: 781,721

[22] Filed: Jan. 10, 1997

Related U.S. Application Data

[60] Provisional application No. 60/009,856 Jan. 16, 1996.

Related U.S. Application Data

[63] Continuation-in-part of Ser. No. 568,174, Dec. 6, 1995.
[51] Int. Cl.⁶ .................................................. A47L 5/32
[52] U.S. Cl. ........................... 15/323; 15/315; 15/334; 15/410
[58] Field of Search ........................... 15/315, 323, 331, 15/334, 335, 410

[56] References Cited

U.S. PATENT DOCUMENTS

| | | |
|---|---|---|
| 1,217,817 | 2/1917 | Peters .................................. 15/315 X |
| 2,196,459 | 4/1940 | Forsberg . |
| 2,343,056 | 2/1944 | Harlett . |
| 2,867,833 | 1/1956 | Duff . |
| 2,953,806 | 9/1960 | Walker . |
| 3,244,437 | 4/1966 | Belicka et al. . |
| 3,351,359 | 11/1967 | Ferraris . |
| 3,568,240 | 1/1969 | Hamrick . |
| 4,050,113 | 9/1977 | Wright et al. . |
| 4,079,965 | 3/1978 | Moughty et al. . |
| 4,376,322 | 3/1983 | Lockhart et al. ........................... 15/323 |
| 4,610,048 | 9/1986 | Ishihara et al. . |
| 4,704,765 | 11/1987 | Ataka ........................... 15/323 |
| 4,955,106 | 9/1990 | Stein et al. . |
| 5,117,533 | 6/1992 | Stuller . |
| 5,617,611 | 4/1997 | Worwag ........................... 15/323 X |

*Primary Examiner*—Chris K. Moore

[57] ABSTRACT

An upright vacuum cleaner includes a housing having a suction motor and a filter chamber. A floor nozzle is connected to the housing. A hose includes a first end, secured to the housing and in communication with the filter chamber, an intermediate portion and a second end. A wand is selectively mounted on the housing. The wand has a first end and a second end wherein the hose intermediate portion extends longitudinally through the wand from the first end to the second end and wherein the hose second end is secured to the wand second end. A clip is secured on the hose intermediate portion such that when the clip is selectively secured to the wand first end, a substantial portion of the hose intermediate portion is stowed in the wand. When the clip is spaced from the wand first end, the substantial portion of the hose intermediate portion is pulled out of the wand.

31 Claims, 18 Drawing Sheets

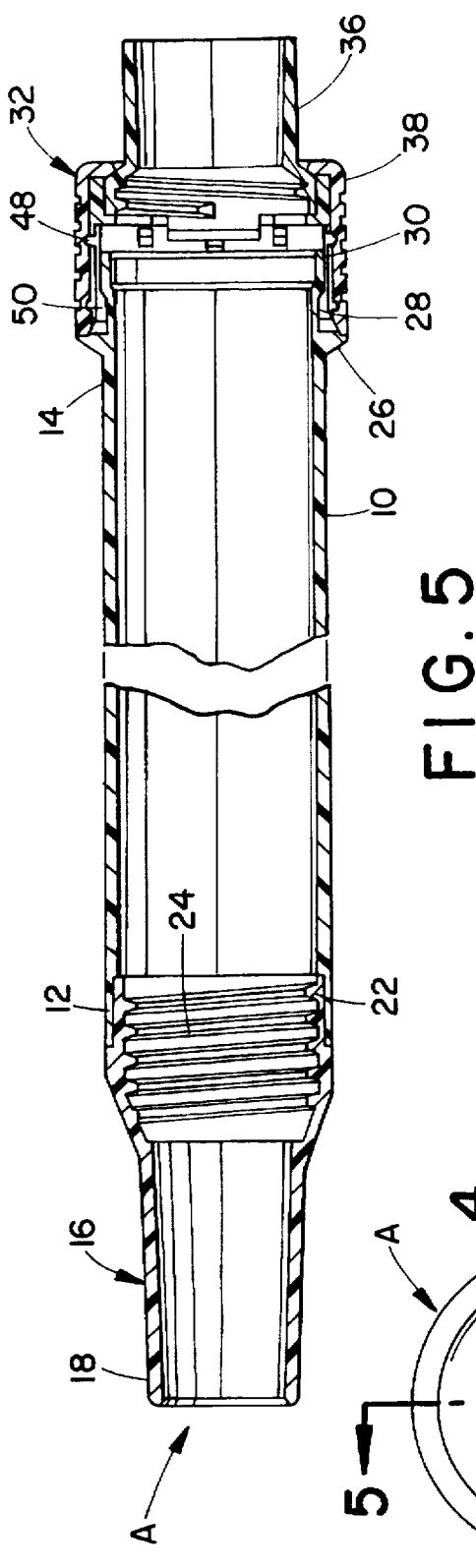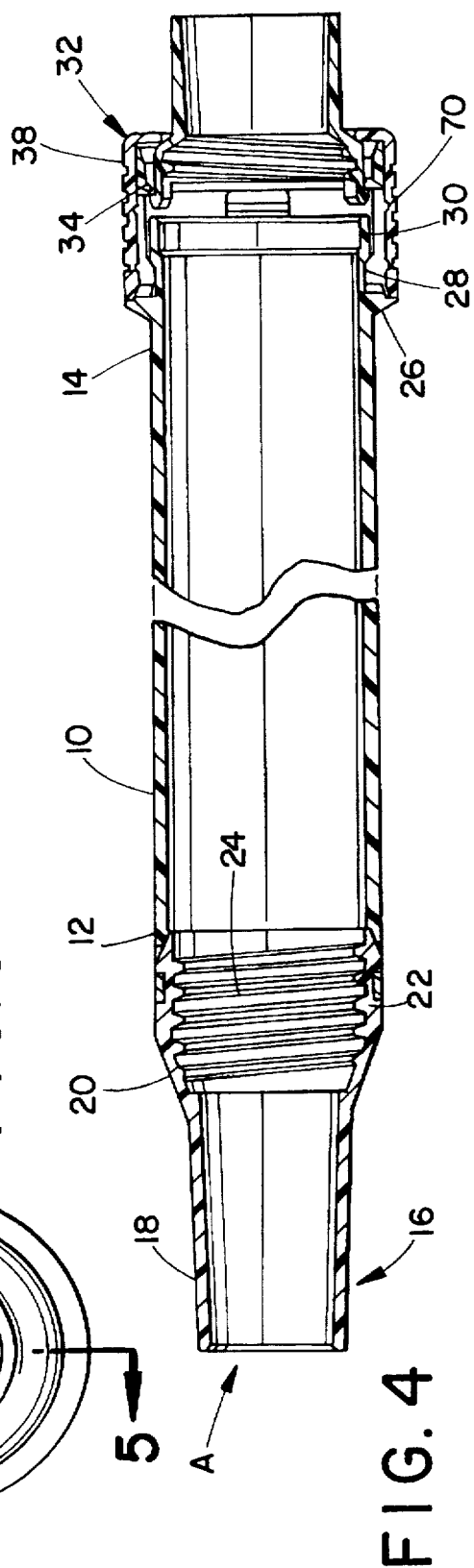

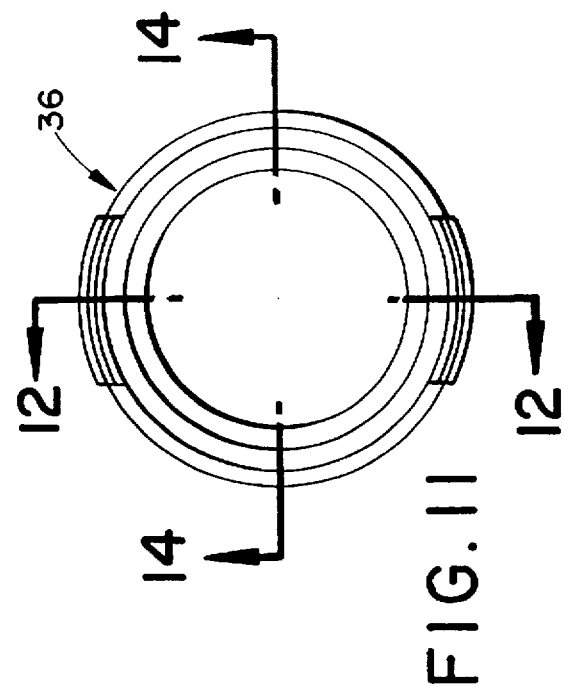
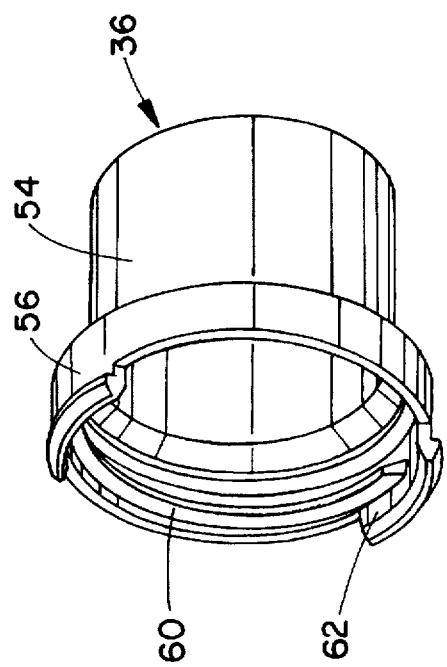
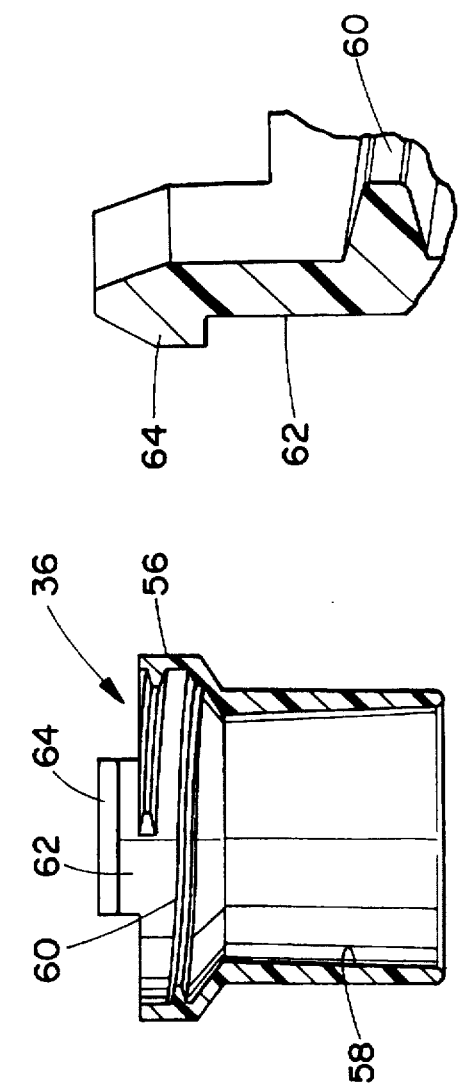
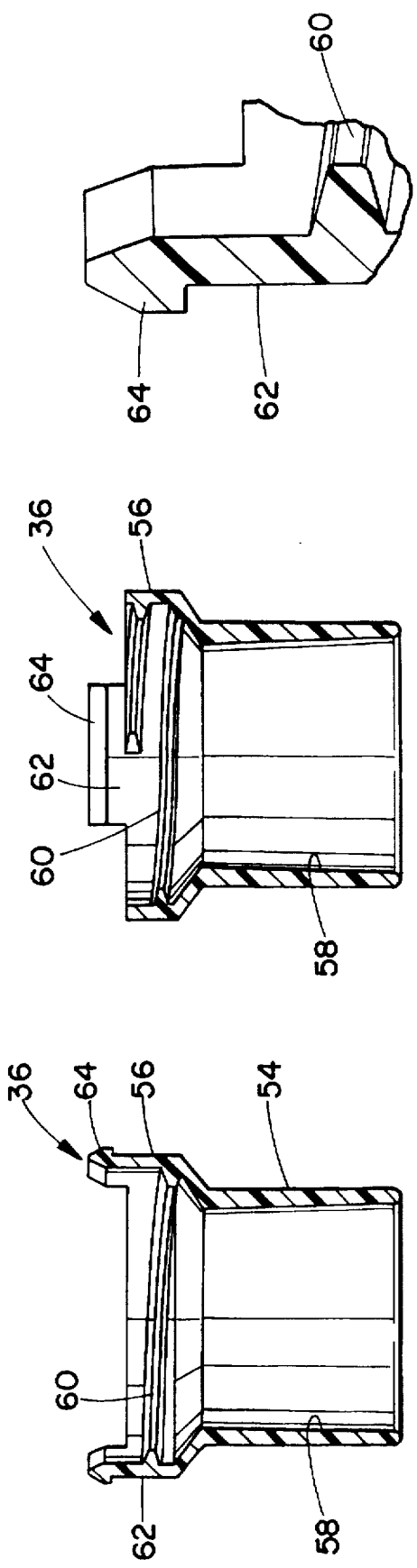

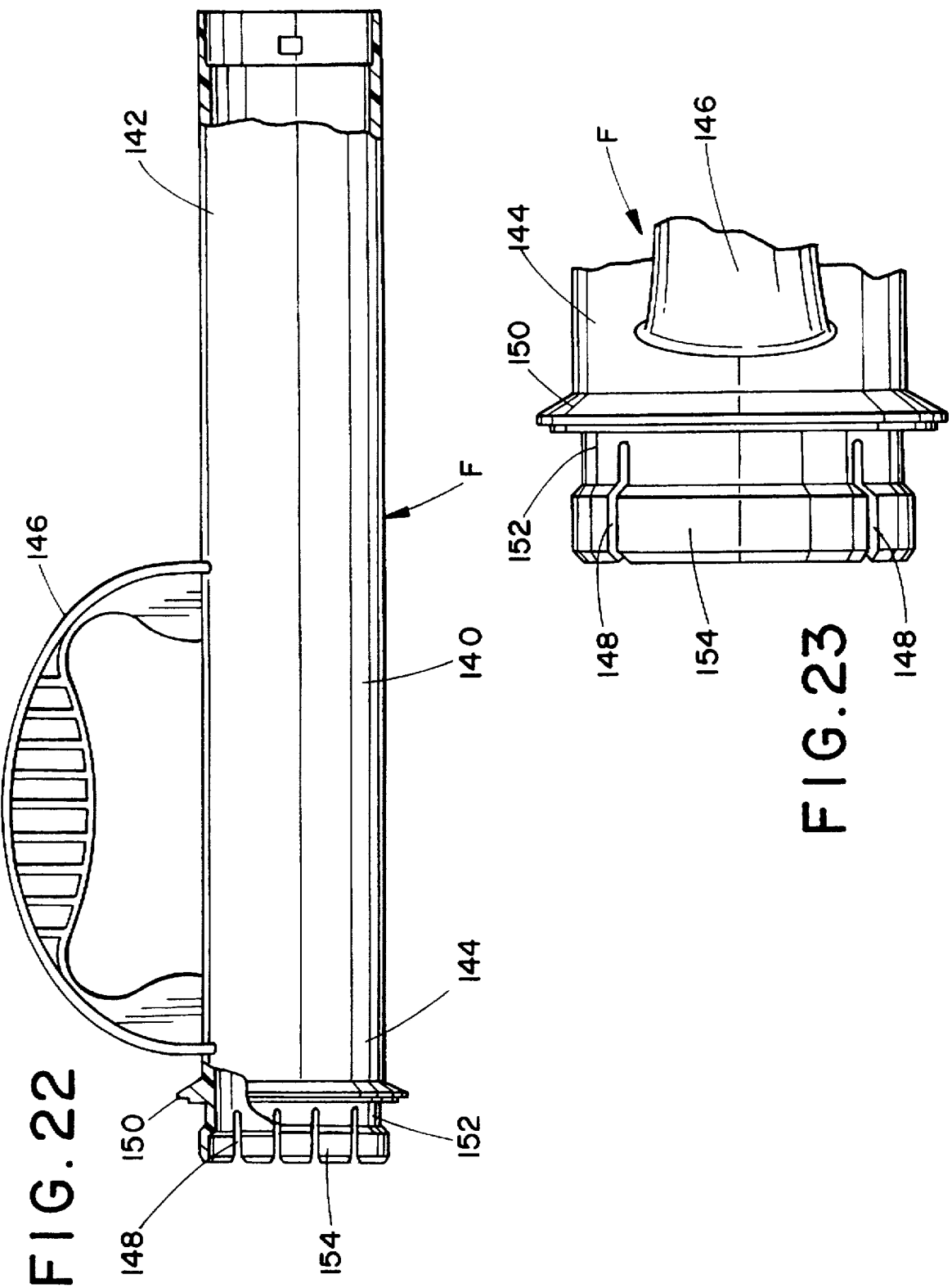

EXTENDABLE HOSE FOR A VACUUM CLEANER

BACKGROUND OF THE INVENTION

This is a continuation-in-part of U.S. patent application Ser. No. 08/568,174, filed Dec. 6, 1995, and a continuation-in-part of U.S. Provisional patent application Ser. No. 60/009,856, filed Jan. 16, 1995.

This invention relates to vacuum cleaners. More particularly, the invention relates to a suction hose having a portion which can be stored in a wand when not needed and can be pulled out of the wand when the wand is in use.

The invention is especially suited for an extendable length wand which can be secured to the free end of a hose of a vacuum cleaner. It should, however, be appreciated by those of average skill in the art that the invention could also be used in various other environments where extendable length conduits are employed.

One problem with conventional vacuum cleaners is that when the vacuum cleaner is used for auxiliary vacuuming operations, the vacuum hose which connects an auxiliary tool, such as a brush or a crevice tool, to the suction inlet of the vacuum cleaner is relatively short. While hose extensions are provided, oftentimes they are not employed simply because it is inconvenient and tedious to connect hose sections together so as to have a suitable length of hose to allow a person to perform the desired auxiliary vacuuming operations.

Various types of telescoping wand assemblies are known for both upright vacuum cleaners and for canister vacuum cleaners. Several of these can be telescopically adjusted and latched at one of a number of preset positions. Such wands are disadvantageous from the standpoint that only a limited number of preset lengths of wand are available. Other types of known telescoping wand assemblies enable an infinite adjustment of the wand by providing a means for locking which enables two wand sections to be locked together at any point along their length. However, the known assemblies of this nature involve the use of several additional parts making such wand assemblies disadvantageous from the standpoint of complexity and cost due to the extra parts involved. Also, all of these known wands are rigid.

It is known that one can store a vacuum hose in a permanently installed type vacuum system so that the hose is ready for withdrawal for use when required. It is also known to temporarily store a hose section in an external hose storage tube of a canister type vacuum cleaner when the hose is not needed. However, neither of these constructions is suitable for use in an upright vacuum cleaner.

Also known is an upright vacuum cleaner having a detachable vacuum hose which is coupled to a hand held wand. The vacuum hose has a first end that can telescope into the wand from a first end thereof to a second end thereof for storage when the wand is not needed. The hose can be pulled out of the wand until the hose first end contacts the wand first end for use in auxiliary cleaning operations. However, this design is disadvantageous from the standpoint that it is expensive to manufacture. Sealing problems may also be experienced as the hose first end slides in the wand between the ends of the wand.

Accordingly, it has been considered desirable to develop a new and improved extendable hose construction for a vacuum cleaner which would overcome the foregoing difficulties and others while providing better and more advantageous overall results.

BRIEF SUMMARY OF THE INVENTION

In accordance with the present invention, a new and improved vacuum cleaner is provided.

More particularly in accordance with this aspect of the invention, the vacuum cleaner comprises a housing having a filter chamber, and a hose including a first end, secured to the housing and in communication with the filter chamber, an intermediate portion and a second end. A tubular wand is selectively mounted on the housing. The wand has a first end and a second end. The hose intermediate portion extends longitudinally through the wand from the wand first end toward the wand second end. The hose second end is positioned adjacent to the wand second end. A connector assembly is secured on the hose intermediate portion and is selectively secured to the wand first end, wherein when the connector assembly is secured to the wand first end a substantial portion of the hose intermediate portion is stowed in the wand. When the connector assembly is spaced from the wand first end, a substantial portion of the hose intermediate portion is pulled out of the wand.

According to another aspect of the invention, an extendable hose assembly for a vacuum cleaner is provided.

More particularly in accordance with this aspect of the invention, the extendable hose assembly comprises a hose including a first end, secured to a housing of the vacuum cleaner, an intermediate portion and a second end. A wand is selectively mounted on the housing. The wand has a first end and a second end. The hose intermediate portion extends longitudinally through the wand from the wand first end toward the wand second end. The hose second end is positioned adjacent to the wand second end. A clip is selectively secured to the wand first end. The clip is secured on the hose intermediate portion, wherein when the clip is secured to the wand first end a substantial portion of the hose intermediate portion is stowed in the wand. When the clip is spaced from the wand first end a substantial portion of the hose intermediate portion is pulled out of the wand.

According to still another aspect of the invention, an extendable hose assembly for a vacuum cleaner is provided.

More particularly in accordance with this aspect of the invention, the extendable hose assembly comprises a tubular wand having a first end and a second end. A hose has a first end, a second end and an intermediate portion therebetween. The hose first end is secured to the wand first end and the hose intermediate portion extends longitudinally through the wand. A connector assembly includes an inner member and outer member. The inner member has a first surface secured to the hose second end and a second surface selectively secured to the wand second end. The outer member cooperates with the inner member to selectively release the inner member second surface from the wand second end.

One advantage of the present invention is the provision of a new and improved vacuum cleaner.

Another advantage of the present invention is the provision of a vacuum cleaner having an auxiliary cleaning system including a wand and a hose connecting the wand to a suction inlet of the vacuum cleaner wherein a portion of the hose can be stowed in the wand when the wand is not in use.

An additional advantage of the present invention is the provision of an extendable length wand which can be connected to either a free end of a length of hose or to a wand secured to the free end of the length of hose.

Still another advantage of the present invention is the provision of an extendable length wand which is infinitely adjustable, is simple to use and which utilizes a minimum of parts.

Yet another advantage of the present invention is the provision of an extendable length wand which has a flexible hose stored therein. A second end of the wand, and one end of the hose, can be distanced from the remainder of the wand so that the first end of the wand can be oriented in any desired angular orientation in relation to the second end of the wand.

Still yet another advantage of the present invention is the provision of an extendable wand assembly for a vacuum cleaner wherein a clip can be selectively secured to an end of the wand in order to hold a hose connector in place on the wand. When the clip is secured to the wand, a hose extending between the hose connector and a front end of the wand is stowed in the wand. When the clip is spaced from the wand, the hose connector is pulled away from the wand—when the wand is in use—and a substantial portion of the hose is pulled out of the wand. This lengthens the wand and enables the wand to be brought closer to a work surface.

A further advantage of the present invention is the provision of an extendable length wand which can be secured to either a free end of a hose or to a second wand in order to extend the length of the hose or of the second wand and allow any conventional cleaning tool, such as a brush or a crevice tool, to be secured to the first end of the wand.

A still further advantage of the present invention is the provision of an extendable hose assembly for a vacuum cleaner including a wand and a hose that can be accommodated on a housing of the vacuum cleaner when they are not in use.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred embodiments of which will be described in detail in the specification and illustrated in the accompanying drawings which form a part hereof and wherein:

FIG. 3 is a front elevational view of an extendable wand assembly according to a first preferred embodiment of the present invention;

FIG. 4 is a cross sectional view of the wand assembly along lines 4—4 of FIG. 3;

FIG. 5 is a cross sectional view of the wand assembly along lines 5—5 of FIG. 3;

FIG. 10 is a perspective view of a hose connector of the wand assembly of FIG. 4;

FIG. 11 is a front elevational view of the hose connector of FIG. 10;

FIG. 12 is a cross sectional view of the hose connector along lines 12—12 of FIG. 11;

FIG. 13 is an enlarged cross sectional view of a portion of the hose connector of FIG. 12;

FIG. 14 is a cross sectional view of the hose connector along lines 14—14 of FIG. 11;

FIG. 22 is a side elevational view of a wand according to a third preferred embodiment of the present invention;

FIG. 23 is an enlarged top plan view of a rear portion of the wand of FIG. 22.

DETAILED DESCRIPTION OF THE PREFERRED EMBODIMENTS

Figure 1:
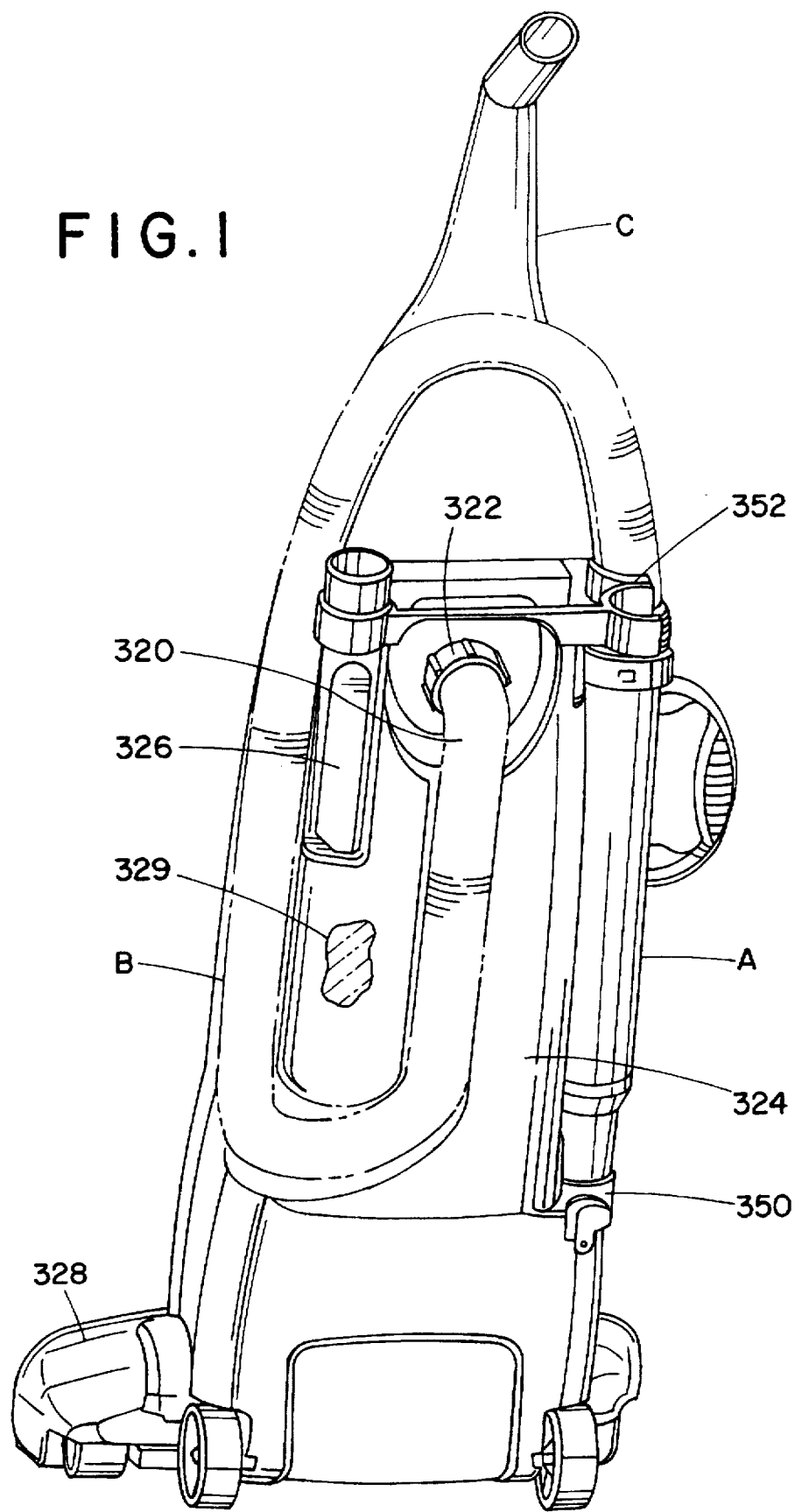
FIG. 1 is a rear elevational view of a vacuum cleaner accommodating the extendable hose construction according to the present invention in a storage position.
Figure 2:
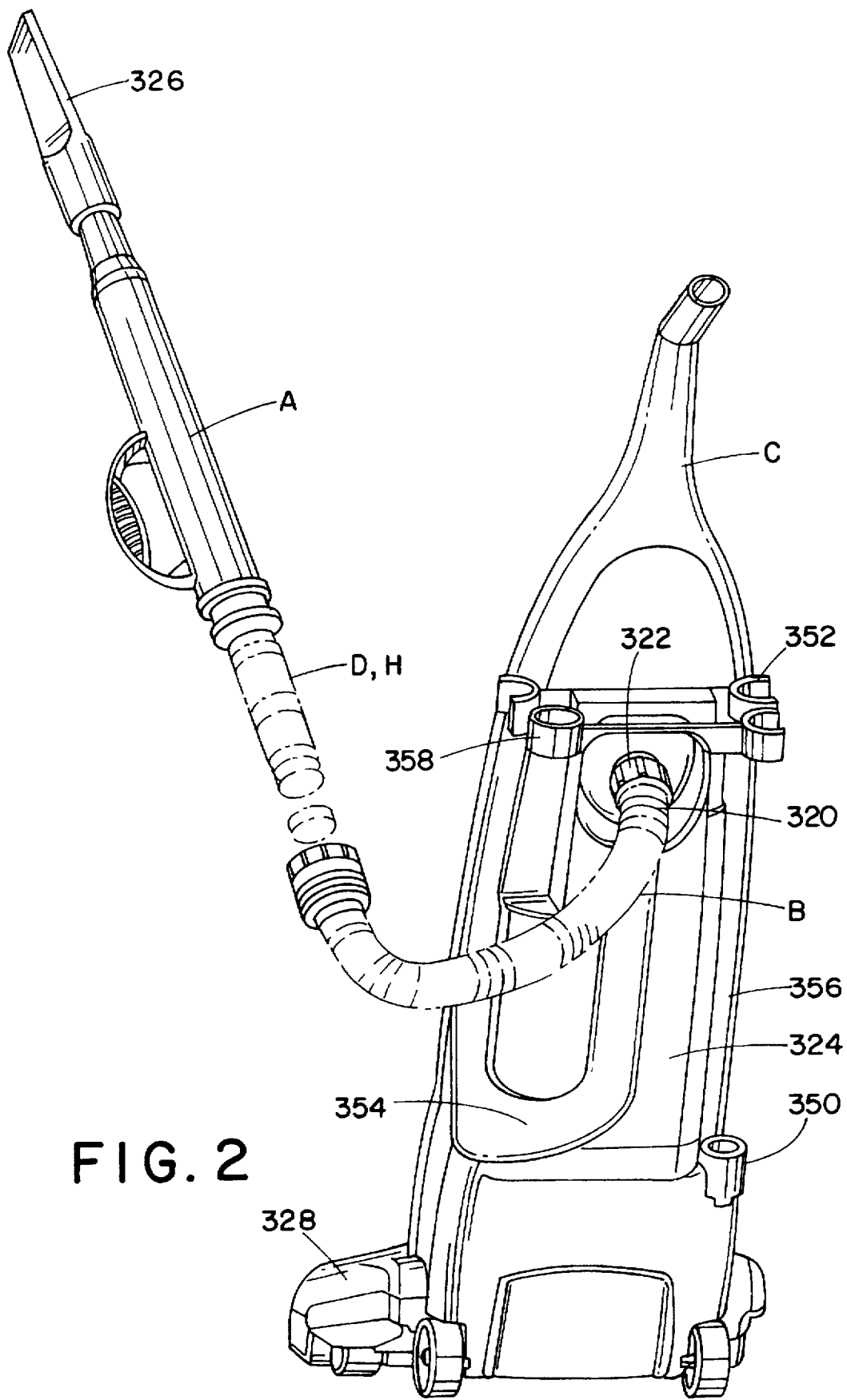
FIG. 2 is a rear elevational view of the vacuum cleaner of FIG. 1 with the extendable hose construction in an extended use position.

Referring now to the drawings wherein the showings are for purposes of illustrating preferred embodiments of the invention only and not for purposes of limiting same, FIGS. 1 and 2 show a wand assembly A which is connected to one end of an external hose B of a vacuum cleaner C. An internal hose D is housed in the wand assembly A. While the vacuum cleaner C is illustrated as being of an upright type, it should be appreciated by those of average skill in the art that the extendable wand construction illustrated herein could also be employed for use on canister vacuum cleaners, wet/dry vacuum cleaners and in a variety of other fluid supply or fluid withdrawal environments.

With reference now to FIG. 4, the wand assembly A according to a first embodiment of the present invention, includes a tubular portion 10 having a first end 12 and a second end 14. An end member 16 is secured to the tubular portion first end 12. The end member 16 includes a first end 18 which is tapered in relation to a second end 20. The second end 20 includes a reduced diameter section 22 which is secured in the tubular portion first end 12. Located on an inner periphery of the end member second end 20 is a helical groove 24.

As illustrated in FIG. 5, located on the second end 14 of the tubular portion 10 is a flange 26. Positioned adjacent the flange 26 is a circumferential groove 28 defined in the outer periphery of the tubular portion second end 14. Located adjacent the groove 28 is a tapered shoulder 30 which forms an end edge of the tubular portion 10.

Located on the second end 14 of the tubular portion 10 is a connector assembly 32. The connector assembly 32 comprises a clip 34, illustrated in FIGS. 6–9, a hose connector 36, illustrated in FIGS. 10–14, and a housing 38, illustrated in FIGS. 15 and 16.

Figure 7:
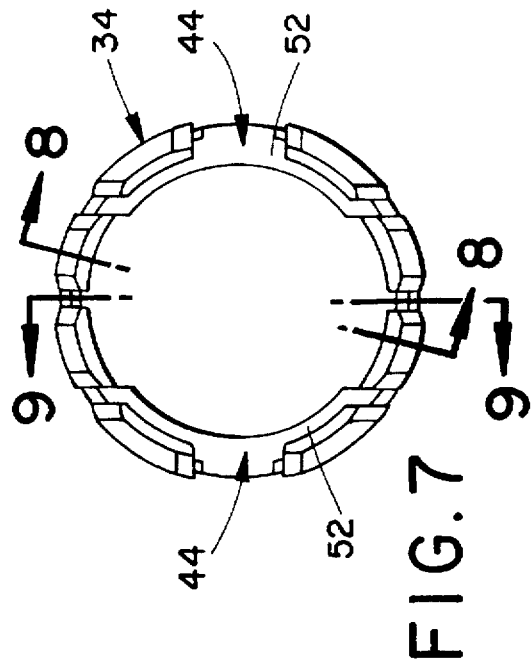
FIG. 7 is a front elevational view of the clip of FIG. 6.
Figure 8:
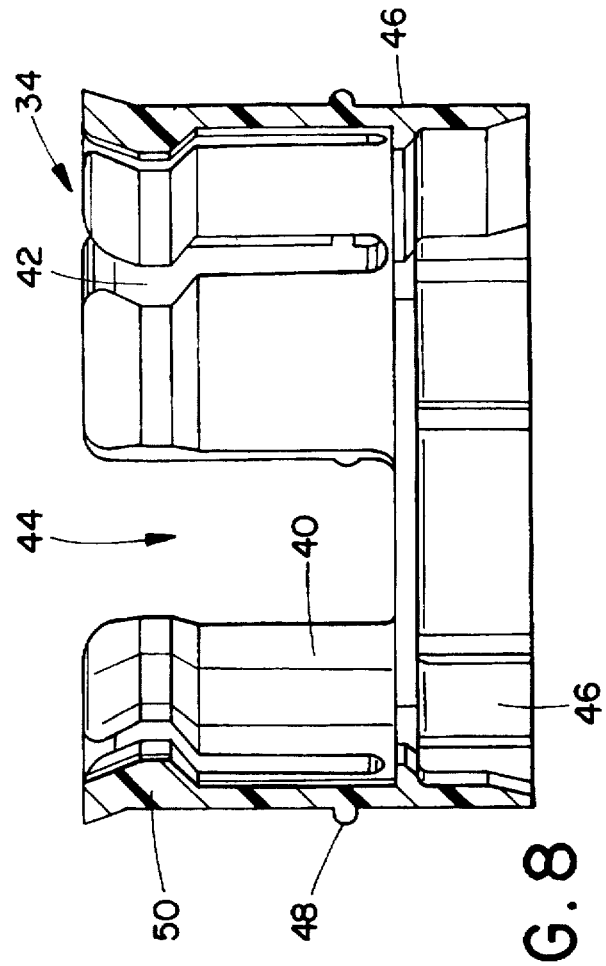
FIG. 8 is an enlarged cross sectional view of the clip along lines 8—8 of FIG. 7.
Figure 6:
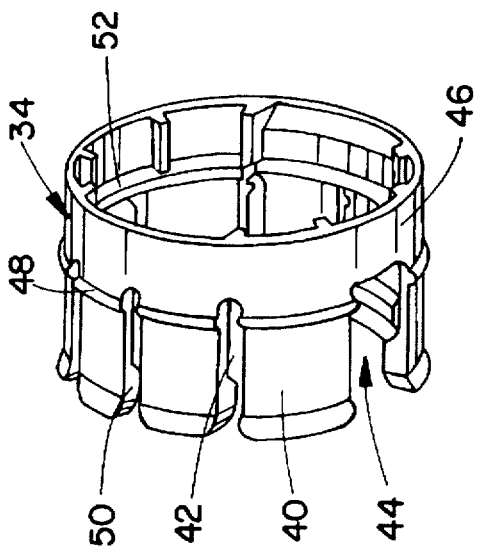
FIG. 6 is a perspective view of a clip of the wand assembly of FIG. 4.
Figure 9:
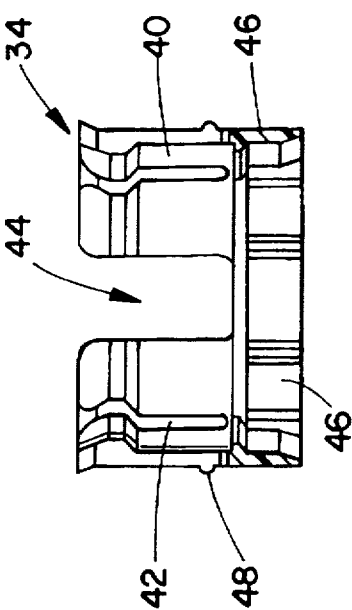
FIG. 9 is a cross sectional view of the clip along lines 9—9 of FIG. 7.

With reference now to FIG. 6, the clip 34, which is made from a suitable resilient plastic material, includes a plurality of spaced fingers 40 separated by slots 42. Also, a pair of wide openings 44 (FIG. 9) separate groups of four fingers 40 from each other. The fingers 40 are defined on a ring 46. Located on an outer surface of each of the fingers 40 is a rib 48. Each of the fingers 40 also has a thickened free end 50 as shown in FIG. 8. Defined on an inner surface of the clip 34 are a pair of semi-circular projections 52 as shown in FIG. 7.

With reference now to FIG. 10, the hose connector 36 includes a reduced diameter end 54 and an enlarged diameter end 56. The reduced diameter end 54 has a tapered inner surface 58, as is evident from FIGS. 12 and 14. Located within the enlarged diameter end 56 is a screw thread 60. Extending from the enlarged diameter end 56 are a pair of spaced arms 62, each of which has located on an outer periphery thereof a rib 64 as shown in FIGS. 12 and 13.

Figure 16:
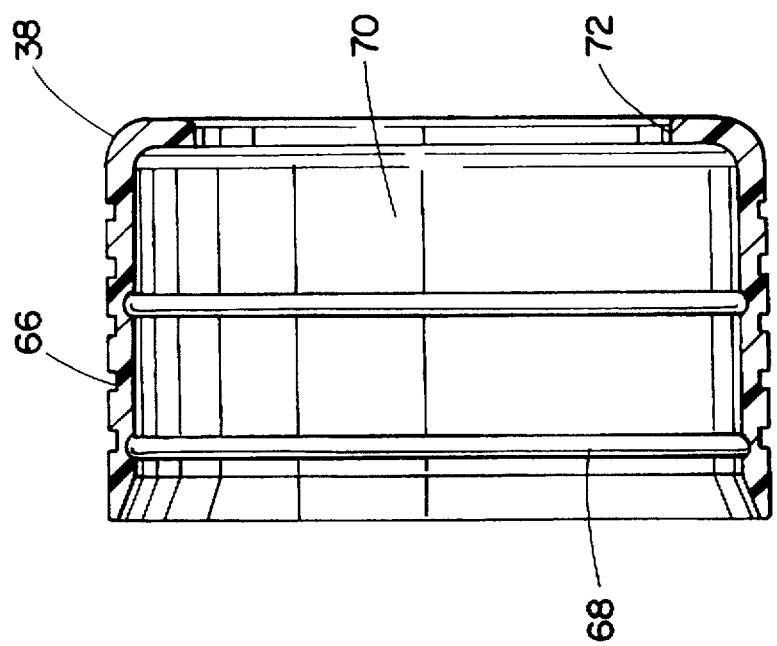
FIG. 16 is a cross sectional view through the housing of FIG. 15.
Figure 15:
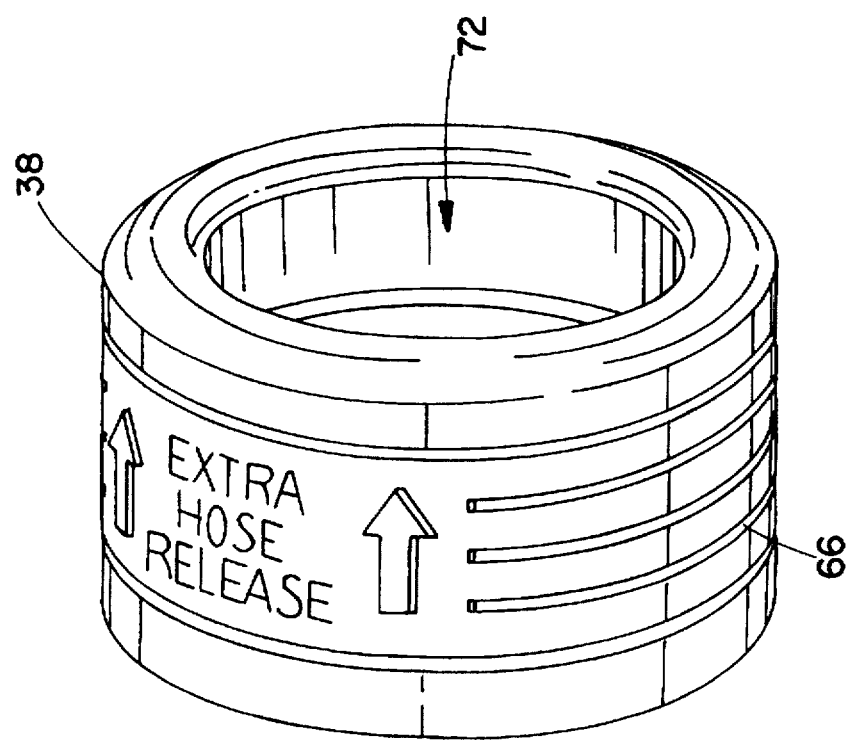
FIG. 15 is a perspective view of a housing of the wand assembly of FIG. 4.

With reference now to FIG. 15, the tubular housing 38 includes an outer periphery on which there are provided a plurality of circumferentially extending spaced grooves 66 that provide a gripping or grasping surface for the housing 38. Located on an inner periphery of the housing 38 are a pair of spaced grooves 68, 70 which extend circumferentially around the inner periphery of the housing 38, as shown in FIG. 16. It is also noted that a centrally positioned aperture 72 is located in the end wall of the housing 38.

As best shown in FIGS. 4 and 5, the ribs 48 located on the fingers 40 of the clip 34 engage in the second groove 70 of the housing 38 to lock the clip 34 in the housing 38. When the connector assembly 32 is held on the second end 14 of the tubular portion 10, the flanged free ends 50 of the fingers 40 engage in the groove 28 defined on the tubular portion second end 14. The hose connector 36 snaps into the clip 34 by the ribs 64 moving past the projections 52 so that the arms 62 are located in the wide openings 44 of the clip 34 in order to prevent a rotation of the hose connector 36 in relation to the clip 34. However, the hose connector 36 and clip 34, together, can rotate in the housing 38 as desired.

Figure 17:
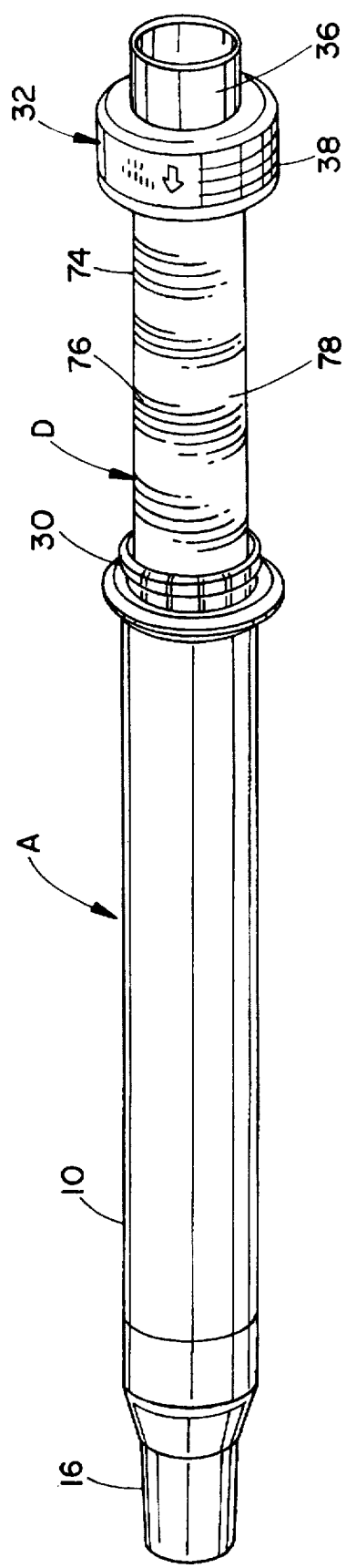
FIG. 17 is a perspective view of the wand assembly of FIG. 4 in an extended position.
Figure 18:
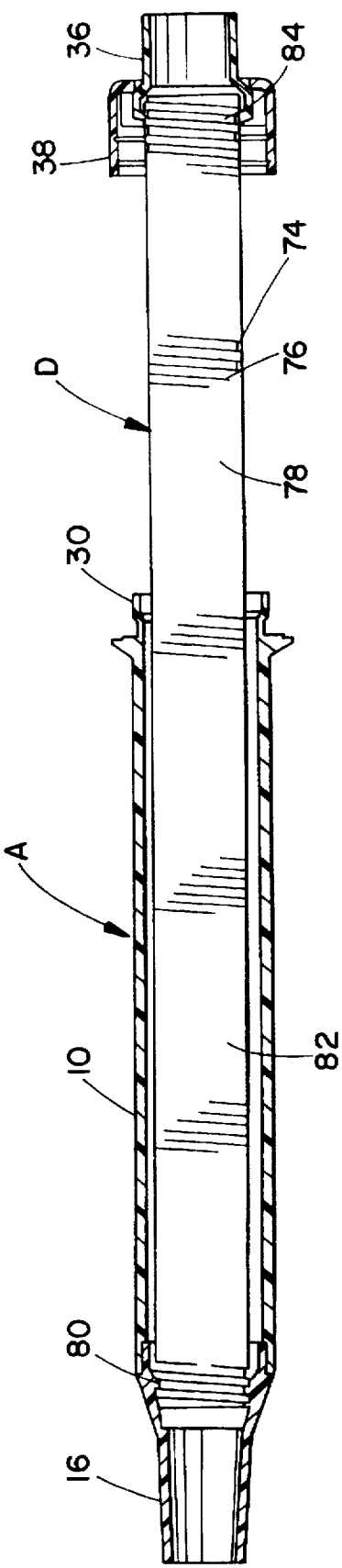
FIG. 18 is a side elevational view in cross section of the wand assembly of FIG. 17.

With reference now to FIG. 17, the wand assembly A accommodates the internal hose D which comprises a flexible, collapsible and expandable hose body 74, including a helical rib 76 between the spirals of which is defined a helical groove 78. As shown in FIG. 18, a first end 80 of the hose body 74 is secured in the helical groove 24 (FIG. 5) of the end member 16 by e.g. adhesive or the like, once the hose first end 80 has been threaded thereinto. An intermediate portion 82 of the hose body 74 is accommodated in a collapsed condition in the wand tubular portion 10. The second end 84 of the hose body 74 is held in the enlarged diameter end 56 of the hose connector 36 because the screw thread 60 thereof fits in the helical groove 78 of the hose body 74 and can be glued in place.

In a first or contracted position, the wand assembly A allows the internal hose D to be accommodated completely within the tubular portion 10 because the connector assembly 32 is secured to the second end 14 of the wand tubular member 10. When it is desired to remove the connector assembly 32 from its locked position on the second end 14 of the tubular portion 10, the operator pulls the connector assembly 32 back away from the wand assembly A. In particular, when the operator pulls on the housing 38, the housing 38 pulls the clip 34 and the hose connector 36 away from the wand second end 14. Rearward movement of the connector assembly 32 permits the internal hose D to be partially pulled out of the tubular body 10 as shown in FIG. 17. This allows the wand assembly A to be lengthened as needed.

Figure 19:
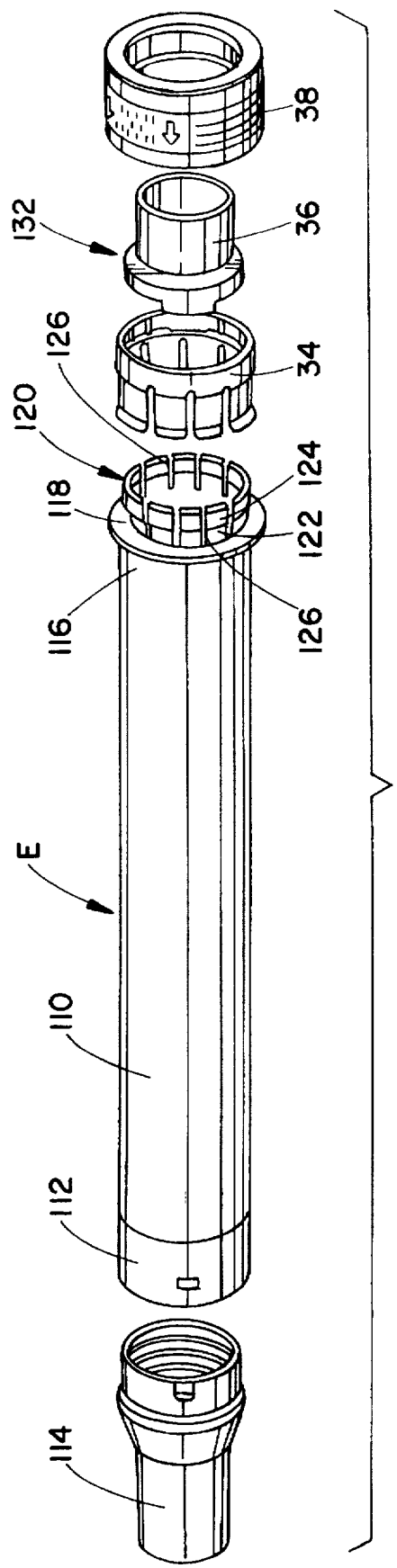
FIG. 19 is an exploded perspective view of a wand assembly according to a second preferred embodiment of the present invention.

With reference now to FIG. 19, a second preferred embodiment of a wand assembly E is there illustrated. The wand assembly E comprises a tubular portion 110 having a first end 112 to which an end member 114 can be secured and a second end 116. Defined on the second end are a flange 118 and a collar 120. The collar 120 includes a grooved section 122 and a tapered shoulder 124. Of particular interest is the provision of a plurality of spaced slots 126 extending longitudinally from a free end of the tubular member 110 towards the flange 118 thereof. The clip 34, hose connector 36 and housing 38 are identical to what has been described above. Therefore, the same connector assembly 32 (FIGS. 6–16) is employed in this embodiment as was described above.

When it is desired to remove the connector assembly 32 from the tubular portion second end 116 so as to deploy the internal hose D, the housing 38 is grasped and pulled rearwardly away from the tubular body 110. As this is happening, the slots 126 in the second end 116 of the tubular portion 110 allow an inward flexure of the tubular portion second end 116—which in essence has a plurality of resilient fingers because the tubular body 110 is made of a suitable plastic material—at the same time that there is an outward flexure of the fingers 40 of the clip 34. This mutual flexure of the two slotted components enables an easy removal of the connector assembly 32 from the tubular member 110 and easy reattachment thereof as well. As with the embodiment of FIGS. 1–18, the housing 38 does not slide in relation to the clip 34. The ribs 48 stay seated in the second groove 70 instead of sliding into the first groove 68 of the connector housing 38.

Figure 20:
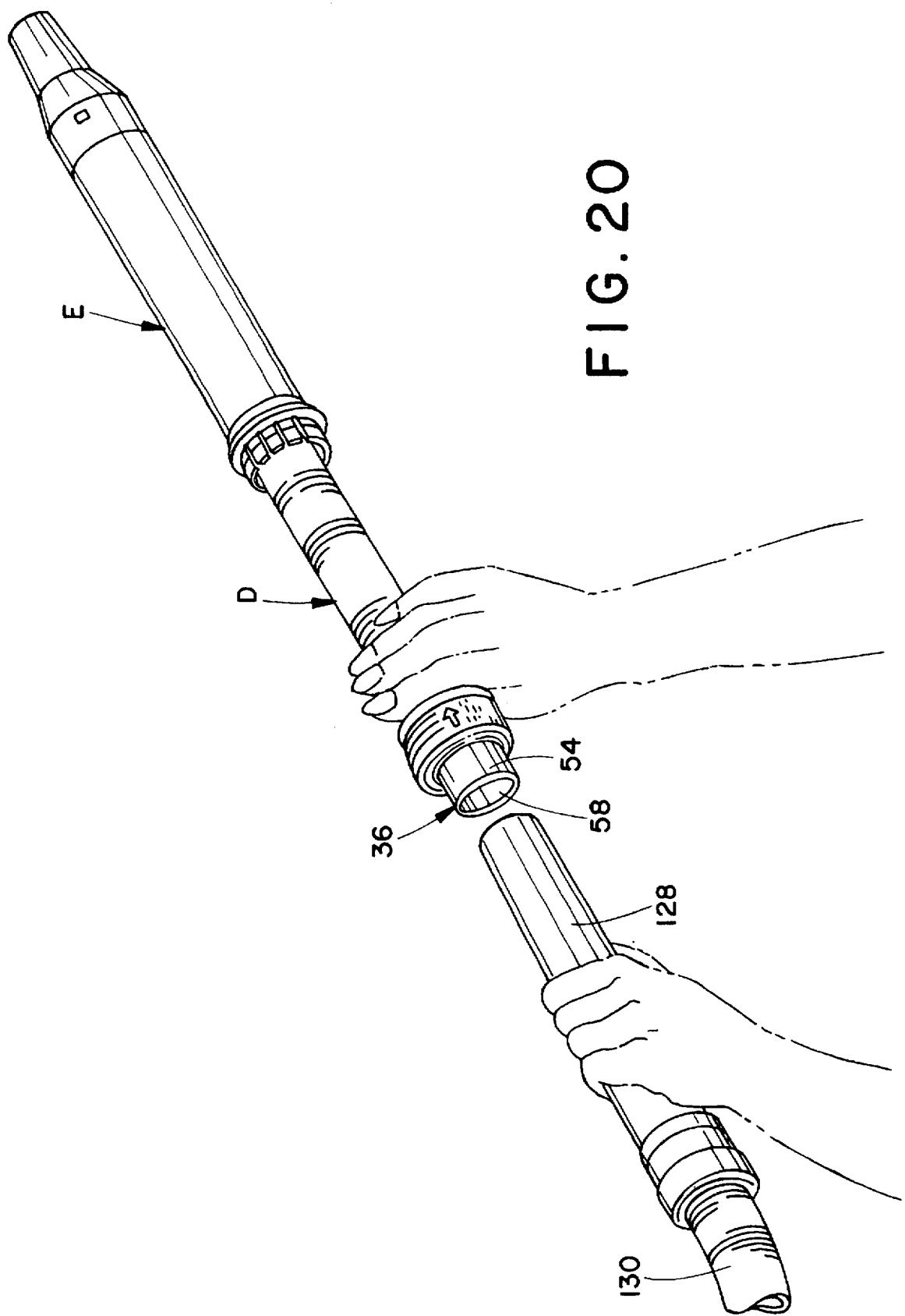
FIG. 20 is a perspective view of the wand assembly of FIG. 19 being connected to a second wand.

With reference now to FIG. 20, a second wand member 128 is shown as being inserted into the tapered interior opening 58 of the reduced diameter section 54 of the hose connector 36. It is evident that an external hose 130 is secured to the second wand 128 while the internal hose D is deployed from the wand assembly E.

Figure 21:
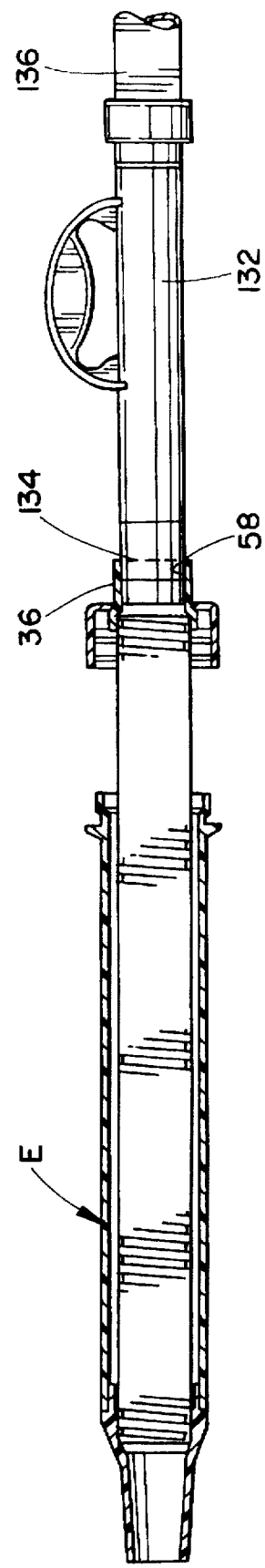
FIG. 21 is a schematic side elevational view, partially in cross section, of the wand assembly of FIG. 19 being connected to another type of wand.

Alternatively, as is illustrated in FIG. 21, the wand assembly E can be used with another type of wand 132. An external end surface 134 of the wand 132 mates with the internal tapered surface 58 of the hose connector 36. Deployed on another end of the wand 132 is yet a further wand 136.

With reference now to FIG. 22, a third type of wand assembly F, according to the present invention, includes a tubular portion 140 having a first end 142, a second end 144 and a handle 146. As illustrated in FIG. 23, a plurality of slots 148 extend from a free end of the tubular portion 140 towards a flange 150 thereof. Located between the flange and the adjacent end of the tubular portion is a grooved section 152 and a tapered shoulder 154.

Figure 24:
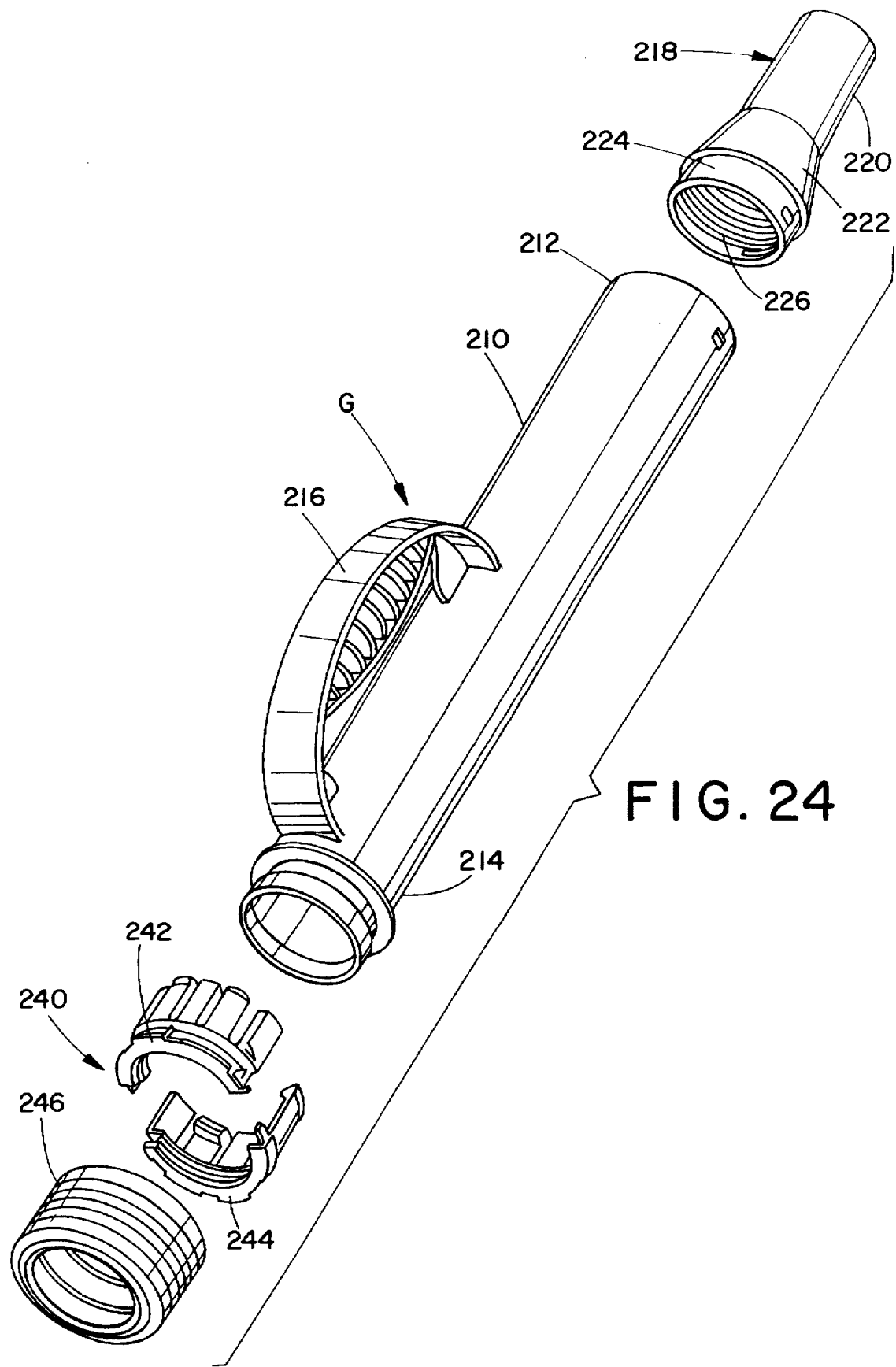
FIG. 24 is an exploded perspective view of a wand of an extendable hose construction according to a fourth preferred embodiment of the present invention.

With reference now to FIG. 24, a wand assembly G according to a fourth embodiment of the present invention includes a tubular portion 210 having a first end 212 and a second end 214. Positioned on an outer periphery of the tubular portion 210 is a handle 216. An end member 218 is secured to the tubular portion first end 212. The end member 218 includes a first end 220 which is tapered in relation to a second end 222 at which is located a reduced diameter section 224. The reduced diameter section 224 is secured in the tubular portion first end 212 to fasten the end member 218 to the tubular portion 210. Located on an inner periphery of the end member second end 222 is a helical groove 226.

Figure 25:
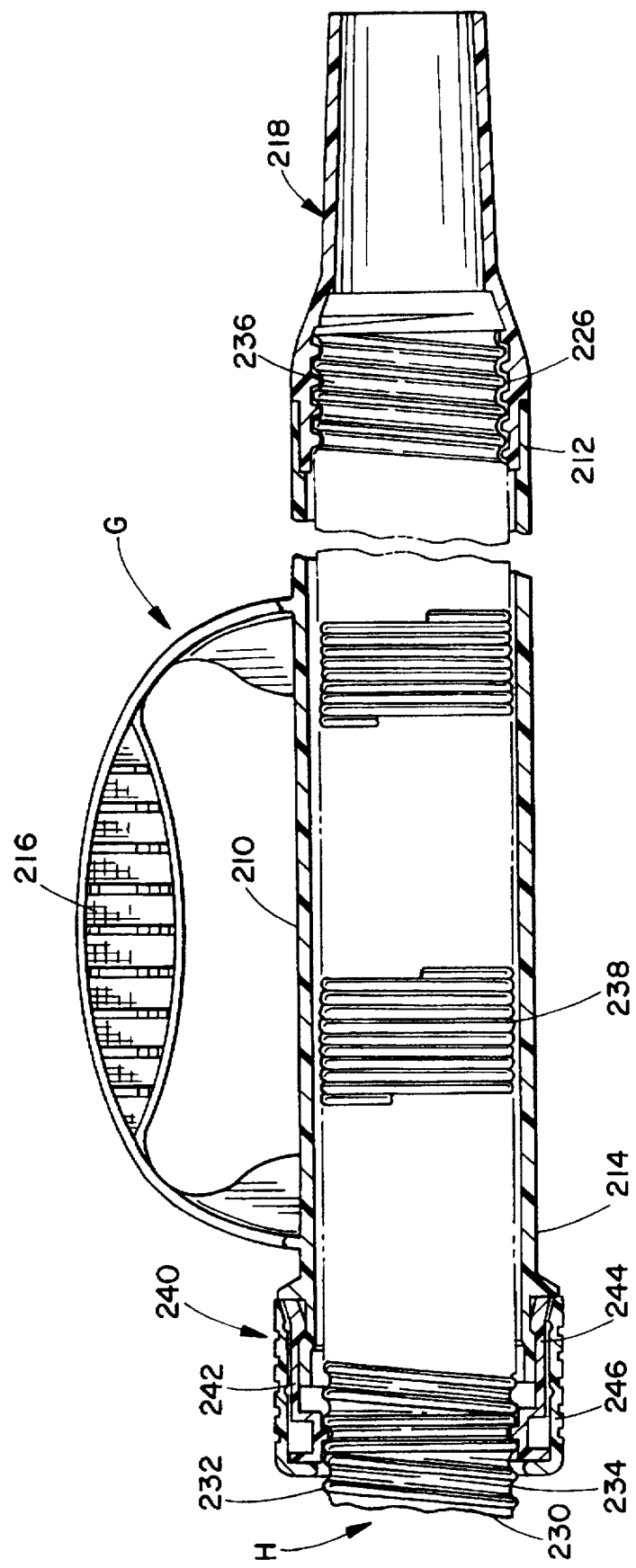
FIG. 25 is a side elevational view in cross-section of the wand of FIG. 24 in an assembled condition with a hose held in the wand in a collapsed condition of the hose.

With reference now to FIG. 25, the wand G accommodates a hose H which comprises a hose body 230 including a helical rib 232 between the spirals of which is defined a helical groove 234. A first end 236 of the hose 230 is secured in the helical groove 226 of the end member 218 by, e.g. adhesive or the like, once the hose first end 236 has been threaded thereinto. An intermediate portion 238 of the hose is accommodated in a collapsed condition in the wand tubular portion 210.

Located on the second end 214 of the tubular portion 210 is a connector assembly 240. With reference now again to FIG. 24, the connector assembly 240 comprises first and second clip members 242 and 244, which constitute an inner member, as well as a housing 246, which constitutes an outer member of the connector assembly 240.

Figure 28:
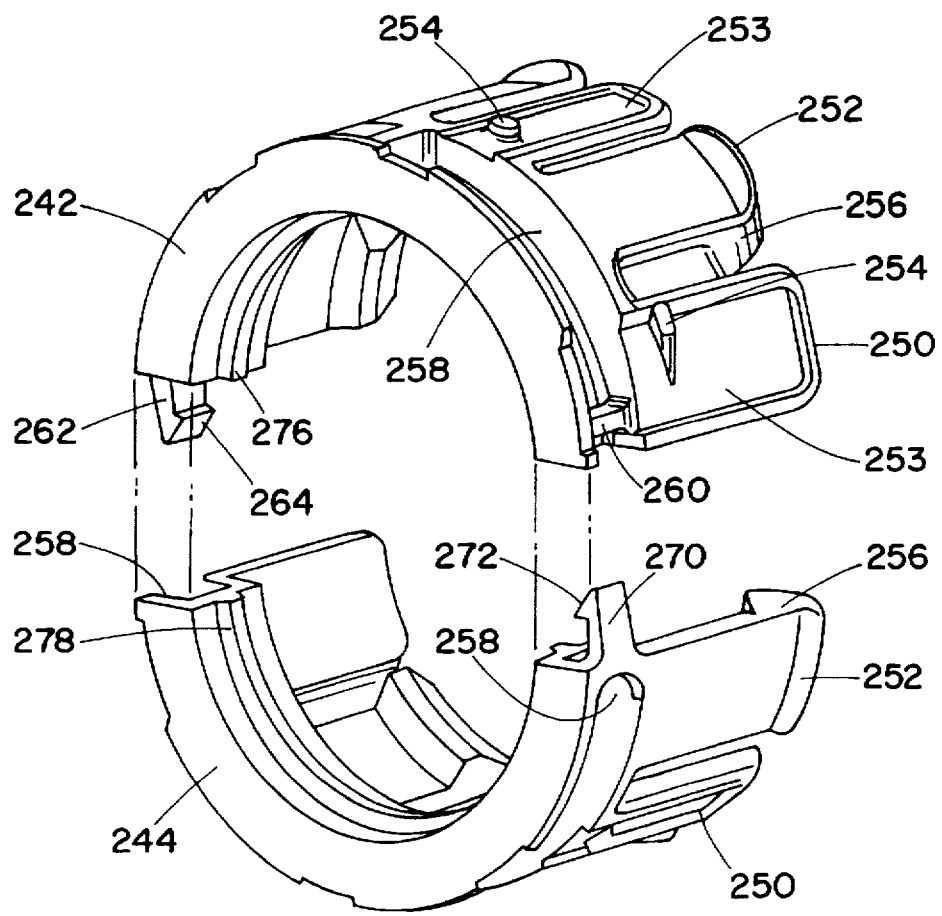
FIG. 28 is an enlarged perspective exploded view of first and second clip members of the connector assembly of FIG. 26.

With reference now to FIG. 28, the first and second members 242 and 244 are mirror images of each other and each include a plurality of first fingers 250 spaced apart by second fingers 252. The first fingers 250 each have a dimpled outer surface 253 on which a projection 254 is defined. The second fingers 252 each have a flanged free end 256. Each of the first and second members 242, 244 also includes a circumferential channel 258 defined on their outer face in a spaced manner from the fingers. A wall 260 extends across the channel at one end thereof. The first member 242 also includes an arm 262 on an opposite end of the channel. The arm 262 has a flanged free end 264. Similarly, the second member 244 includes on one end of its channel 258 an arm 270 on which a flanged free end 272 is provided. Defined on the inner face of the first and second clip members 242 and 244 is a respective circumferential projection 276 and 278.

In use, the two clip members 242 and 244 are secured to each other via the enlarged ends 264 and 272 of the pair of arms 262 and 270 engaging the respective walls 260 provided in the grooves 258 of each clip member. This is accomplished as the clip members are positioned around the outer periphery of the hose body 230 such that the projections 276 and 278 engage in the helical groove 234 of the hose. Since the groove 234 is helical and the projections 276 and 278 are circumferential, a portion of the helical rib 232 will be crushed by the projections 276 and 278. This will insure that the hose is not able to translate or rotate in relation to the inner member formed by the pair of clips.

Figure 26:
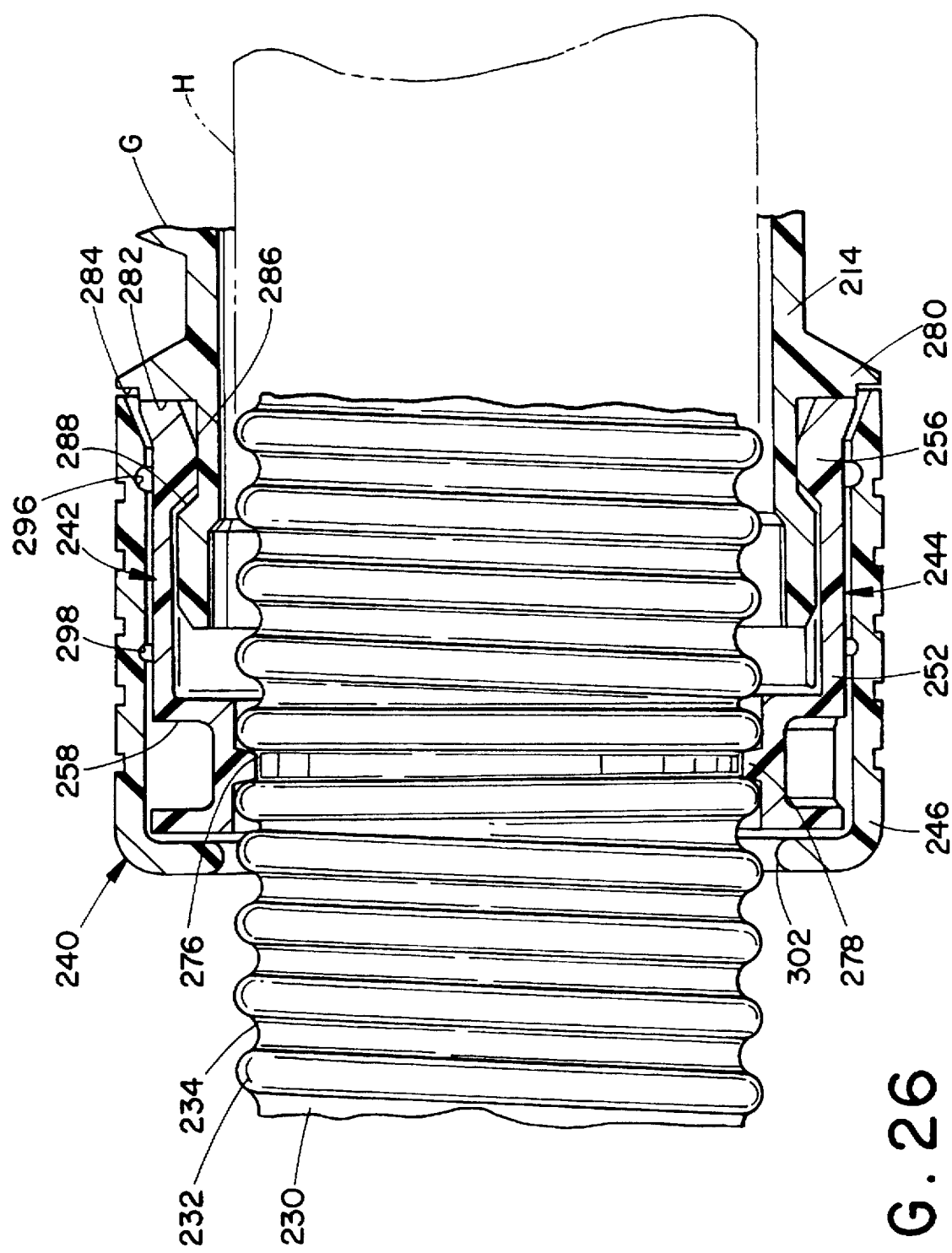
FIG. 26 is an enlarged side elevational view in cross-section of a second end of the wand of FIG. 25 illustrating a connector assembly.

Referring now to FIG. 26, the tubular portion second end 214 includes a flange 280 having a substantially planar face 282 with a recessed shoulder 284. The tubular portion second end also comprises a groove 286 located adjacent the face 282 and a tapered shoulder 288 located on the far end of the groove.

Figure 27:
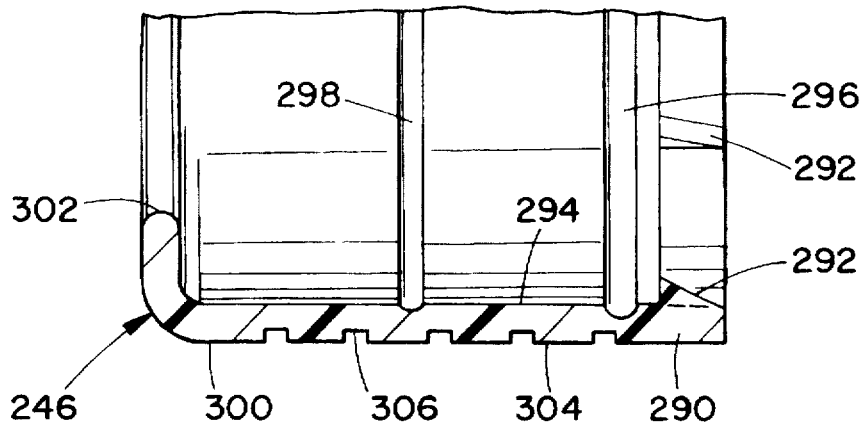
FIG. 27 is a side elevational view in cross-section of a portion of a housing or outer member of the connector assembly of FIG. 26.

With reference now also to FIG. 27, the outer member or housing 246 is tubular and comprises a first end 290 on which is located a series of spaced tapered teeth 292 which lead to an inner periphery 294. A first groove 296 extends circumferentially around the inner periphery of the tubular housing member in a spaced manner from the teeth 292. Spaced from the first groove is a second circumferentially extending groove 298. Located on a second end 300 of the housing 246 is a centrally positioned aperture 302.

It can be seen from FIG. 26 that the diameter of the aperture 302 in the housing 246 is large enough to accommodate the outer periphery of the hose body 230 so that the hose can extend therethrough. Located on an outer periphery 304 (FIG. 27) of the housing 246 are a plurality of spaced circumferentially extending grooves 306 that provide a gripping or grasping surface for the housing. The outer member or housing 246 is secured in position over the inner member via an engagement of the projections 254 in the second groove 298 provided on the inner periphery 294 of the housing 246. The teeth 292 prevent a rotation of the outer member 246 in relation to the inner member because the teeth project into slots between the fingers 250 and 252.

The wand 210 and the front end 218 of the wand assembly G of FIG. 24 can be made from a suitable relatively rigid thermoplastic material, such as ABS. Similarly, the housing 246 can be made from ABS. However, the first and second members 242 and 244 are made from a second, somewhat more resilient, thermoplastic material such as acetal. The hose 230 itself is preferably made from a vinyl material for good compressibility and resilience. The rib in the hose 230 can be made from any suitable conventional metal.

With reference again to FIG. 26, it can be seen that in a first position, the connector assembly 240 is secured on the tubular portion second end 214. In this position, the enlarged ends 256 of the second fingers 252 extend into the recessed area 286 defined in the tubular portion second end 214.

When it is desired to remove the connector assembly 240 from its locked position on the second end 214 of the tubular portion 210, the operator pulls the connector assembly backwards, away from the wand G. When the operator pulls on the housing 246, the projections 254 slide out of the groove 298 and the housing 246 slides in relation to the clip members 242 and 244 until the projections 254 engage in the first groove 296 of the housing 246. Further sliding of the housing 246 in relation to the clip members 242 and 244 is prevented by the engagement of the teeth 292 against the wall of the clips constituting the end of each slot defined between the fingers 250 and 252. The rearward movement of the housing 246 will allow the resilient second fingers 252 of the inner member to flex outwardly so that the enlarged ends 256 thereof will slide up the tapered shoulder 288. Such outward flexing of the second fingers 252 is allowed since the housing 246 will have been slid away from the fingers.

When the housing 246 is in its rearward position in relation to the clips 242 and 244, it is locked in that position because the projections 254 are located in the first groove 296. When it is desired to again reattach the connector assembly 240 to the wand, the inner member is slid onto the second end 214 of the wand until the enlarged ends 256 of the second fingers 252 are again accommodated in the groove 286. At this point, the housing 246 can again be slid forwardly over the clips 242 and 244 until the projections 254 are again accommodated in the second groove 298. At this point, the connector assembly 240 is again locked in place on the wand body 210.

With reference again to FIG. 1, a second end 320 of the hose H is secured via a connector assembly 322 to a vacuum cleaner housing 324. Also clipped to the housing 324 is a crevice tool 326. Provided at a lower end of the housing 324 is a floor nozzle 328. A filter chamber 329 is located in the vacuum cleaner housing to communicate with the hose second end 320. A suction motor (not visible) is located either in the housing 324 or in the floor nozzle 328.

Figure 29:
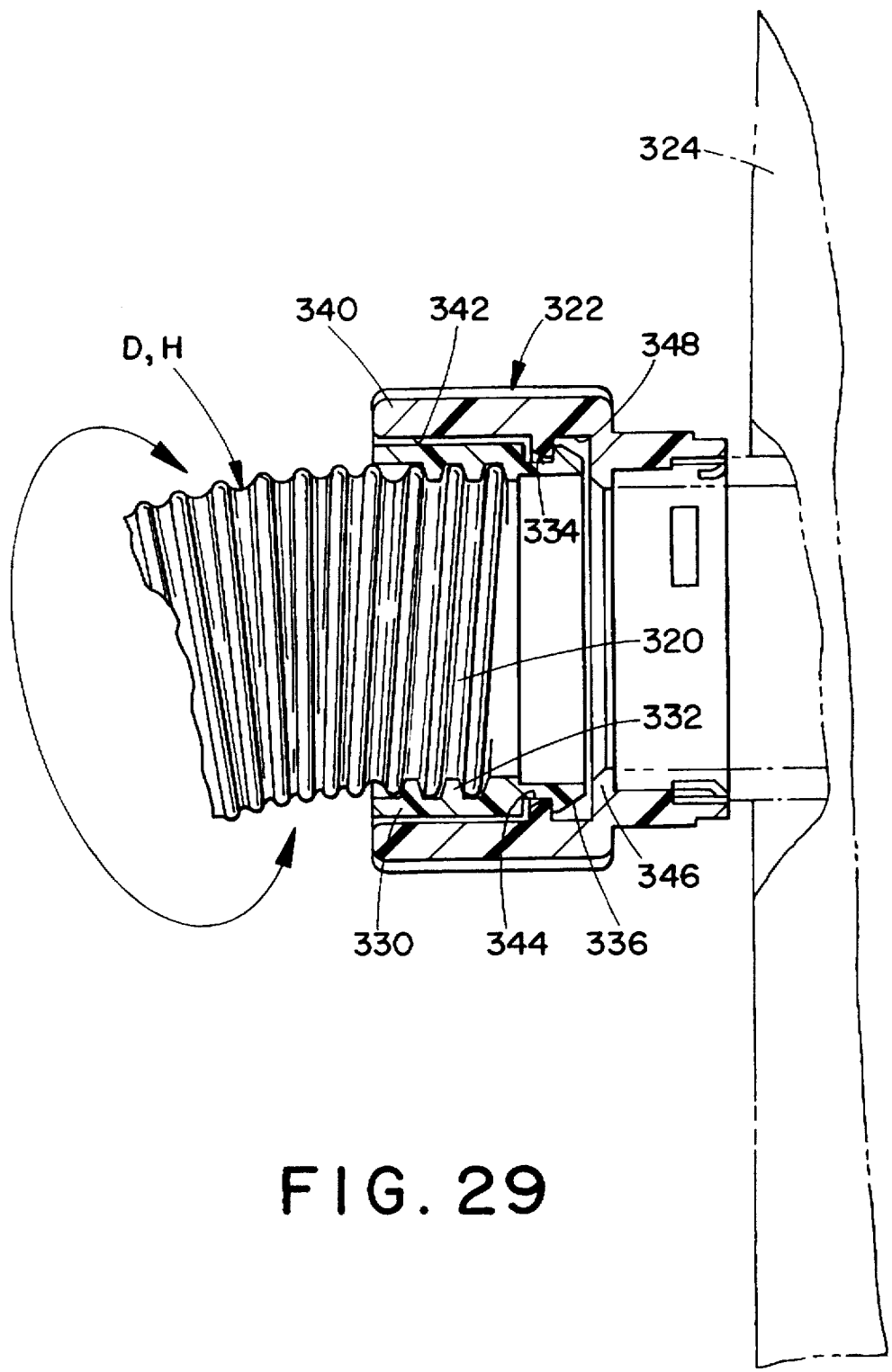
FIG. 29 is a side elevational view partially in cross-section of a connector assembly securing a first end of the hose to a housing of a vacuum cleaner.

With reference now to FIG. 29, the connector assembly 322 comprises a swivel 330 having an inner helical groove 332 in which the second hose end 320 is accommodated. The second hose end 320 is secured to the swivel 330 via a conventional adhesive or the like. The swivel 330 also includes a circumferential groove 334 defining a flanged end 336. The swivel 330 is positioned in a connector body 340 having a cylindrical construction with an inner periphery 342 of a large enough diameter to accommodate an outer periphery of the swivel 330. Located on the inner periphery 342 of the connector body 340 is a radially inwardly extending rib 344 which is accommodated in the groove 334. Positioned between the rib 344 and a flange 346 is a circumferentially extending channel 348 in which the flanged end 334 of the swivel is accommodated. The hose swivel 330 can be made from ABS.

With reference again to FIG. 1, located on the vacuum cleaner housing 324 is a socket 350 in which an end member of the wand A, or the end member 218 of the wand G can be selectively held. Also located on the housing 324 is a support clip 352 for selectively holding a portion of the hose body B.

In FIG. 1, the wand and hose are illustrated in their storage position on the vacuum cleaner. With reference now to FIG. 2, the wand and hose are shown in their use position. In this position, the hose which is illustrated in a collapsed form in FIG. 25 has now been pulled out of the wand for use. In order to do this, the connector assembly 240 is pulled away from the tubular portion second end 214. This movement enables the collapsed hose to be pulled out of the wand to its extended position. The amount of hose which can be held in the tubular portion 210 in a collapsed position is about 11 inches of hose. When the hose is pulled out of the wand and extended, 44 inches of hose are provided. In other words, a 4 to 1 compression of the hose is provided via this construction.

As shown in FIG. 2, the rear surface of the housing 324 includes an indented portion 354 in which at least a portion of the circumference of the hose is accommodated. The housing rear wall also includes an indented portion 356 for accommodating the wand. Moreover, a collar 358 is provided on the housing for holding the tool 326 on the housing 324.

Figure 30:
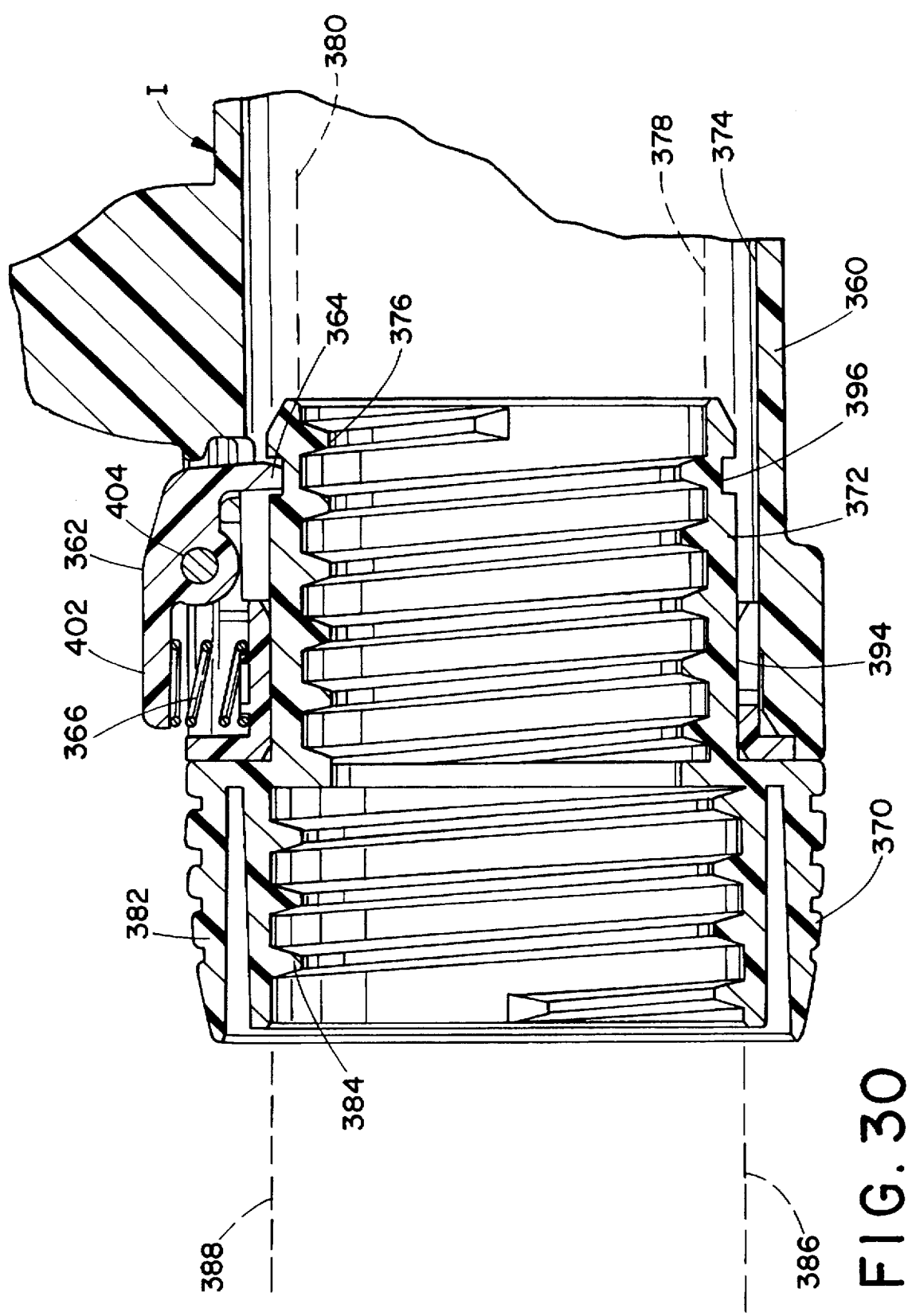
FIG. 30 is an enlarged side elevational view in cross-section of a second end of a wand and a connector assembly according to a fifth preferred embodiment of the present invention.
Figure 31:
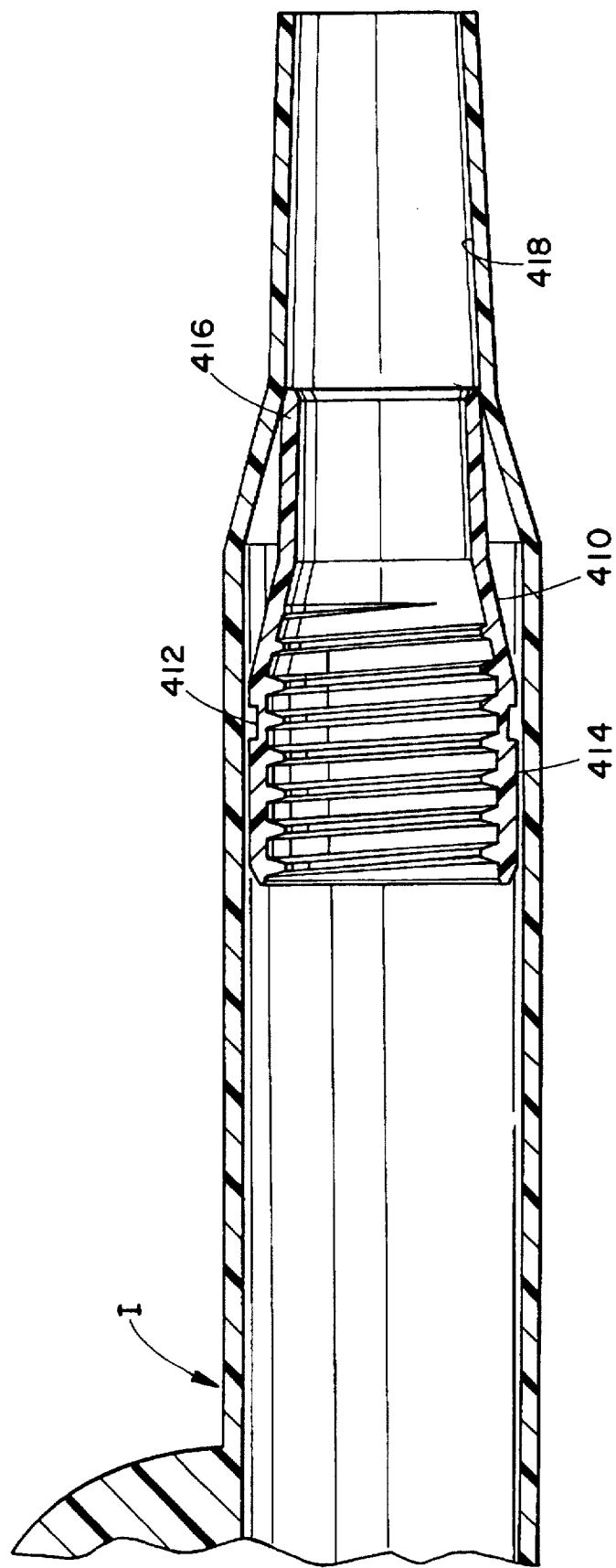
FIG. 31 is a side elevational view in cross section of a first end of the wand of FIG. 30.

With reference now to FIG. 30, a fifth preferred embodiment of the invention is there illustrated. In this embodiment, a second end 360 of a wand I includes a pivotal latch 362 having a finger 364 and a biasing spring 366. The latch mechanism 362 is meant to selectively hold a connector assembly 370 on the wand second end. The connector assembly comprises a first section 372 of a diameter suitably smaller than the diameter of an inner periphery 374 of the wand. The first section 372 has a helical screw thread 376 sized and shaped to accommodate a suitably threaded end 378 of a first hose section 380. The first hose section 380 extends through the wand I to a front end thereof (FIG. 31).

The front end of the hose section 380 can be secured to the front end of the wand in the same manner as is illustrated, e.g. in FIG. 25 of the drawings.

The connector assembly 370 also comprises a second section 382 having a threaded inner periphery 384 in which the first end 386 of a second hose section 388 can be accommodated. As is evident in FIG. 30, the two hose sections 380 and 388 communicate with each other inside the connector assembly 370 in a leak-proof manner. Defined on an outer periphery 394 of the first connector assembly section 372 is a circumferential groove 396. The groove accommodates the finger 364 of the latch 362 in order to hold the connector assembly 370 to the wand I. When it is desired to remove the connector assembly 370 from the wand, I, the operator need merely push on a thumb portion 402 of the latch 362 thereby allowing it to pivot around a pivot point 404 thereby pulling the finger 364 out of the groove 396. At this time, the connector assembly 370 can then be pulled rearwardly away from the wand I so that the first section 372 thereof is no longer located within the wand. At the same time, the first hose section 380, which is in a collapsed condition when held in the wand I, can be pulled out to a significant extent so as to allow a longer reach for the hose construction.

It has been stated above that the front end of the first hose section 380 is secured to the front end of the wand in the same manner as is illustrated in, e.g., FIG. 25 of the drawings. However, alternatively, the front end of the first hose section can be secured to a slidable hose end housing 410 as is illustrated in FIG. 31. In this embodiment the hose end housing 410 can slide rearwardly in the wand I until the finger 364 engages in a groove 412 located on an outer periphery 414 of the hose end housing. It should be appreciated from FIG. 31 that a front end 416 of the hose end housing sealingly engages an inner surface 418 of the wand I when the end housing is in the forwardmost position as is illustrated.

While a hose assembly with first and second sections of different diameters is disclosed in FIG. 30, it should be appreciated that a hose having a single diameter could be substituted therefor if suitable modifications were made to the configuration of the connector 370. That is, if the spiraling groove 384 was made the same diameter as the groove 376, then a single diameter hose assembly can be secured therein via suitable conventional means such as adhesive or the like.

The invention has been described with reference to several preferred embodiments. Obviously, modifications and alterations will occur to others upon the reading and understanding of the preceding specification. It is intended that the invention be construed as including all such alterations and modifications insofar as they come within the scope of the appended claims or the equivalents thereof.

We claim:

1. A vacuum cleaner comprising:

a housing comprising a filter chamber;

a hose including a first end, secured to said housing and in communication with said filter chamber, an intermediate portion and a second end;

a tubular wand selectively mounted on said housing, said wand having a first end and a second end, wherein said hose intermediate portion extends longitudinally through said wand from said wand first end toward said wand second end and wherein said hose second end is positioned adjacent to said wand second end; and, a connector assembly secured on said hose intermediate portion and selectively secured to said wand first end, wherein when said connector assembly is secured to said wand first end a substantial portion of said hose intermediate portion is stowed in said wand and when said connector assembly is spaced from said wand first end said substantial portion of said hose intermediate portion is pulled out of said wand.

2. The vacuum cleaner of claim 1, wherein said connector assembly comprises:

an inner member which cooperates with said wand first end and is secured to said hose intermediate portion; and an outer member which encircles said inner member and is secured thereto, said outer member being provided with a grasping surface.

3. The vacuum cleaner of claim 2, wherein:

said inner member includes a pair of flanges projecting inwardly from an inner periphery thereof, and said connector assembly further includes a hose connector having a screw thread on an inner periphery thereof for engaging said intermediate hose portion and a pair of spaced arms each having a rib for engaging with one of said flanges of said inner member.

4. The vacuum cleaner of claim 2, wherein:

said wand first end includes a circumferential groove defined by a tapered shoulder forming an end edge of said wand first end, said tapered shoulder includes a plurality of circumferentially spaced slits extending longitudinally from said end edge of said wand first end, said inner member includes a plurality of fingers each having a thickened free end, and said thickened free ends resiliently contact said circumferential groove when said connector assembly is secured to said wand first end.

5. The vacuum cleaner of claim 4, wherein one of said plurality of fingers of said inner member and said, outer member comprises a rib and another of said plurality of fingers of said inner member and said outer member comprises a groove, said rib cooperating with said groove to secure said inner and outer members to each other.

6. The vacuum cleaner of claim 2, wherein said inner member comprises a pair of semicircular members which are secured together to encircle an outer periphery of said hose intermediate portion.

7. The vacuum cleaner of claim 1, wherein said hose includes:

a first hose section which is held in said wand when said connector assembly is secured to said wand first end; and a second hose section located outside of said wand at all positions of said connector assembly.

8. The vacuum cleaner of claim 1, wherein said connector assembly comprises:

a clip selectively secured to said wand first end;

a hose connector having a first portion secured to said hose intermediate portion and a second portion secured to said clip; and a housing secured to said clip.

9. The vacuum cleaner of claim 8, wherein:

said housing includes a circumferentially extending groove, and said clip includes a plurality of fingers each having a rib extending from an outer periphery thereof into said groove, said housing urging said clip to engage and disengage from said wand first end in response to a force applied to the housing by a user.

10. The vacuum cleaner of claim 8, wherein:

said housing includes a first circumferentially extending groove and a second circumferentially extending groove spaced apart from said first groove on an inner periphery thereof, and said clip includes a plurality of fingers each having a rib extending from an outer periphery thereof into said first groove when said clip is secured to said wand first end, said ribs being urged from said first groove to said second groove in response to a force applied to the housing by a user to disengage said clip from said wand first end.

11. The vacuum cleaner of claim 1, wherein one of said connector assembly and said wand first end comprises a locking finger and another of said connector assembly and said wand first end comprises a recessed area, said locking finger cooperating with said recessed area to secure said connector assembly to said wand.

12. The vacuum cleaner of claim 1, wherein said connector assembly comprises:

a latch on said wand first end, said latch having a finger projecting through an inner periphery of said wand; and an inner member secured on said hose intermediate portion and having a circumferential groove on an outer periphery thereof, said finger projecting into said circumferential groove to engage said inner member when said connector assembly is secured to said wand first end.

13. An extendable hose assembly for a vacuum cleaner, comprising:

a hose including a first end secured to a housing of the vacuum cleaner, an intermediate portion and a second end;

a wand selectively mounted on said housing, said wand having a first end and a second end, wherein said hose intermediate portion extends longitudinally through said wand from said wand first end toward said wand second end and said hose second end is positioned adjacent to said wand second end; and, a clip selectively secured to said wand first end, said clip being secured on said hose intermediate portion, wherein when said clip is secured to said wand first end a substantial portion of said hose intermediate portion is stowed in said wand and when said clip is spaced from said wand first end said substantial portion of said hose intermediate portion is pulled out of said wand.

14. The extendable hose assembly of claim 13, further comprising:

a hose connector having a screw thread on an inner periphery thereof for engaging said intermediate hose portion and a pair of spaced arms each having a rib; and said clip having a pair of flanges projecting inwardly from an inner periphery thereof for engaging with one of said ribs of said hose connector.

15. The extendable hose assembly of claim 13, wherein:

said wand first end includes a circumferential groove defined by a tapered shoulder forming an end edge of said wand first end, said tapered shoulder includes a plurality of circumferentially spaced slits extending longitudinally from said end edge of said wand first end, said clip includes a plurality of fingers each having a thickened free end, and said thickened free ends resiliently contact said circumferential groove when said clip is secured to said wand first end.

16. The extendable hose assembly of claim 15, wherein said hose includes:

a first hose section which is held in said wand when said connector assembly is secured to said wand first end; and a second hose section located outside of said wand at all positions of said connector assembly.

17. The extendable hose assembly of claim 15, further comprising:

a housing which encircles said clip and is secured thereto, said housing being provided with a grasping surface.

18. The extendable hose assembly of claim 17, wherein one of said plurality of fingers of said clip and said housing comprises a rib and another of said plurality of fingers and said housing comprises a groove, said rib cooperating with said groove to secure said housing to said clip.

19. The extendable hose assembly of claim 13, wherein said clip comprises a pair of semicircular members which are secured together to encircle an outer periphery of said hose intermediate portion.

20. The extendable hose assembly of claim 13, further comprising:

a hose connector having a first portion secured to said hose intermediate portion and a second portion secured to said clip; and a housing secured to said clip.

21. The extendable hose assembly of claim 20, wherein:

said housing includes a circumferentially extending groove, and said clip includes a plurality of fingers each having a rib extending from an outer periphery thereof into said groove, said housing urging said clip to engage and disengage from said wand first end in response to a force applied to the housing by a user.

22. The extendable hose assembly of claim 20, wherein:

said housing includes a first circumferentially extending groove and a second circumferentially extending groove spaced apart from said first groove on an inner periphery thereof, and said clip includes a plurality of fingers each having a rib extending from an outer periphery thereof into said first groove when said clip is secured to said wand first end, said ribs being urged from said first groove to said second groove in response to a force applied to the housing by a user to disengage said clip from said wand first end.

23. The extendable hose assembly of claim 13, wherein one of said clip and said wand first end comprises a locking finger and another of said clip and said wand first end comprises a recessed area, said locking finger cooperating with said recessed area to secure said clip to said wand.

24. The extendable hose assembly of claim 13, further comprising:

a latch on said wand first end, said latch having a finger projecting through an inner periphery of said wand; and said clip having a circumferential groove on an outer periphery thereof, said finger projecting into said circumferential groove to engage said clip when said clip is secured to said wand first end.

25. An extendable hose assembly, comprising:

a tubular wand having a first end and a second end;

a hose having a first end, a second end and an intermediate portion therebetween, said hose first end secured to said wand first end and said hose intermediate portion extending longitudinally through said wand;

a connector assembly including an inner member and outer member, said inner member having a first surface secured to said hose second end and a second surface selectively secured to said wand second end, said outer member cooperating with said inner member to selectively release said inner member second surface from said wand second end.

26. The hose assembly of claim 25, wherein said inner member comprises:

a clip selectively secured to said wand second end; and a hose connector having a first portion secured to said hose second end and a second portion secured to said clip.

27. The hose assembly of claim 26, wherein said hose connector comprises:

a screw thread on an inner periphery thereof for engaging said hose second end and a pair of spaced arms each having a rib; for engaging said clip.

28. The hose assembly of claim 26, wherein:

said wand second end includes a circumferential groove defined by a tapered shoulder forming an end edge of said wand second end, said clip includes a plurality of fingers each having a thickened free end, said thickened free ends resiliently contacting said circumferential groove when said clip is secured to said wand second end, and said clip includes a pair of flanges projecting inwardly from an inner periphery thereof for engaging said hose connector.

29. The hose assembly of claim 26, further comprising a screw thread associated with an inner periphery of said wand first end for threadably engaging said hose first end.

30. The hose assembly of claim 29, further comprising an end member secured to said wand first end, said end member including a first end positioned within said wand first end, said end member first end having said screw thread on an inner periphery thereof.

31. The hose assembly of claim 26, wherein said wand second end includes:

a circumferential groove defined by a tapered shoulder forming an end edge of said wand second end; and a circumferential flange positioned adjacent said groove remote from said end edge.

* * * * *